(12) United States Patent
Miyamoto et al.

(10) Patent No.: US 7,937,848 B2
(45) Date of Patent: May 10, 2011

(54) COORDINATE MEASURING AUXILIARY TOOL, COORDINATE MEASURING PROBE AND COORDINATE MEASURING MACHINE

(75) Inventors: Shigeo Miyamoto, Kawasaki (JP); Mitsuhiro Watanabe, Kawasaki (JP)

(73) Assignee: Mitutoyo Corporation, Kawasaki-shi (JP)

( * ) Notice: Subject to any disclaimer, the term of this patent is extended or adjusted under 35 U.S.C. 154(b) by 227 days.

(21) Appl. No.: 12/023,292

(22) Filed: Jan. 31, 2008

(65) Prior Publication Data
US 2008/0184573 A1    Aug. 7, 2008

(30) Foreign Application Priority Data
Feb. 5, 2007    (JP) .................. 2007-025518

(51) Int. Cl.
G01B 5/016    (2006.01)
(52) U.S. Cl. ........................................................ 33/503
(58) Field of Classification Search .................. 33/503, 33/556, 558–559, 561
See application file for complete search history.

(56) References Cited

U.S. PATENT DOCUMENTS

| | | | | |
|---|---|---|---|---|
| 4,516,327 A * | 5/1985 | Kanda et al. ..................... | 33/556 |
| 4,701,704 A | 10/1987 | Fukuyoshi et al. | |
| 4,815,214 A * | 3/1989 | Enderle et al. ................... | 33/832 |
| 5,101,548 A * | 4/1992 | McMurtry et al. ............... | 483/62 |
| 5,327,657 A * | 7/1994 | Hajdukiewicz et al. ......... | 33/503 |
| 5,848,477 A * | 12/1998 | Wiedmann et al. ............. | 33/503 |
| 6,154,976 A | 12/2000 | Yamashiro et al. | |
| 6,854,195 B2 * | 2/2005 | Jordil et al. ..................... | 33/556 |
| 7,228,641 B2 * | 6/2007 | Hunter et al. ................... | 33/556 |
| 7,281,336 B2 * | 10/2007 | Lummes et al. ................. | 33/503 |
| 7,284,337 B2 * | 10/2007 | Brenner et al. ................. | 33/558 |
| 7,472,491 B2 * | 1/2009 | Fischer .......................... | 33/561 |
| 7,552,543 B2 * | 6/2009 | Tomelleri ....................... | 33/561 |
| 7,770,302 B2 * | 8/2010 | Tanaka .......................... | 33/561 |
| 2003/0208920 A1 * | 11/2003 | Giegerich et al. .............. | 33/561 |
| 2004/0118000 A1 | 6/2004 | Roth et al. | |
| 2004/0154178 A1 | 8/2004 | Herkt et al. | |
| 2004/0194331 A1 | 10/2004 | Haimer | |

FOREIGN PATENT DOCUMENTS

| CH | 687960 | 4/1997 |
|---|---|---|
| JP | 06262419 | 9/1994 |

* cited by examiner

Primary Examiner — Yaritza Guadalupe-McCall
(74) Attorney, Agent, or Firm — Rankin, Hill & Clark LLP

(57) ABSTRACT

A coordinate measuring auxiliary tool including a cylindrical shaped body that is attached to an outer circumference of a coordinate measuring probe, and a clamping mechanism for positioning and fixing the cylindrical shaped body to a tip of the probe. Measurement of a thin plate-shaped object to be measured can be easily and accurately performed with the coordinate measuring auxiliary tool having a simple construction and low price. At least a part of the cylindrical shaped body may be transparent, and a position of the cylindrical shaped body to the tip of the probe can be adjusted.

3 Claims, 6 Drawing Sheets

COORDINATE MEASURING AUXILIARY TOOL, COORDINATE MEASURING PROBE AND COORDINATE MEASURING MACHINE

CROSS-REFERENCE TO RELATED APPLICATION

The disclosure of Japanese Patent Application No. 2007-25518 filed on Feb. 5, 2007 including specifications, drawings and claims is incorporated herein by reference in its entirety.

BACKGROUND OF THE INVENTION

1. Technical Field

The present invention relates to a coordinate measuring auxiliary tool, a coordinate measuring probe and a coordinate measuring machine, more particularly, to a coordinate measuring auxiliary tool, which is suitable for a ball probe of a manual operation type three-dimensional coordinate measuring machine or digitizer and capable of easily and accurately measuring a thin plate-shaped object to be measured, a coordinate measuring probe equipped with the coordinate measuring auxiliary tool, and a coordinate measuring machine equipped with the coordinate measuring probe.

2. Description of the Related Art

For example, in a manual operation type three-dimensional coordinate measuring machine, a probe having, at the tip, a ball for contact with an object to be measured being relatively moved manually in a three-dimensional direction, a central coordinate value of the ball being measured at the moment or while the ball being brought into contact or making contact with the object to be measured, and then offset processing is executed for the radius of the ball with respect to the central coordinate value of the ball and a contact position of the ball and the object to be measured can be measured. However, a direction of offset with respect to the measured central coordinate of the ball is required to be pre-specified or to be geometrically calculated with use of measured central coordinate values of a plurality of balls. For example, in the case where the object to be measured is a hole, the ball is guided and brought into contact with three positions of the inside of the hole and each central coordinate value is measured. Next, the center and the radius of a hole circle is obtained by applying the three coordinate values to a circle circulation, and the radius of the hole can be obtained by adding the calculated radius to the radius of the ball.

However, in the case of a thin object, such as sheet metal, having a thickness smaller than the radius of the ball, the probe is required to be guided in the hole measurement so that the tip of the ball is brought into contact with the object to be measured. Therefore, work becomes difficult and skill is required. Additionally, as shown in FIG. 1, with respect to a work 9 which is made of a thin steel plate, if a ball 2 fixed at the tip of a shaft 3 of the probe 1 is brought into contact with the work 9 and measurement is made at a deviated position such as a measurement position 8 and not at a measurement position 7 to which the ball 2 should be made to contact, a problem such as a large measurement error may be caused.

In order to solve the problem, the applicant has proposed, as shown in FIG. 2 or in FIGS. 1 to 3 of Japanese Published Unexamined Patent Application No. H10-62150 (Patent Document 1), that a mark 4 having a predetermined width is attached to the maximum outer circumference of the ball 2 and serves as a standard of measurement.

Additionally, in FIGS. 2 to 5 in Japanese Published Unexamined Patent Application No. 2005-147673 (Patent Document 2), it has been proposed, as shown in FIG. 3, that a ¾ spherical probe formed of the ball 2 which is partially notched to the center C is used, and the center C of the ball 2 is directly made to profile the work 9. In FIG. 3, the reference numeral 11 denotes a push button switch which is provided on a probe body 10 and used for storing current position data only when being pushed.

Further, a V-shaped probe having a V-shaped tip has been put to practical use.

However, in the technology disclosed in patent document 1, an operator is required to visually position the mark 4 of the ball 2 to the work 9 and to entirely concentrate on that, and further, accurate positioning is not easy.

On the other hand, in the ¾ spherical probe disclosed in patent document 2 and the V-shaped probe, it is necessary to work a ball or a tip of a probe into a specific shape, and it is difficult to not only precisely work a center position but maintain the precision.

Further, it is difficult to correct the center position (calibration), and there remains a problem that the total cost increases.

SUMMARY OF THE INVENTION

The present invention was made in order to solve the above problems, and aims at providing a coordinate measuring auxiliary tool which is capable of easily and accurately measuring a thin plate-shaped object to be measured in measuring by a manual operation type three-dimensional coordinate measuring machine or digitizer, a coordinate measuring probe equipped with the coordinate measuring auxiliary tool, and a coordinate measuring machine equipped with the coordinate measuring probe.

The coordinate measuring auxiliary tool of the present invention solves the above problems, including a cylindrical body attached to an outer circumference of the coordinate measuring probe and means for positioning and fixing a cylindrical shaped body to the tip of the probe.

Here, making at least a part of the cylindrical shaped body transparent allows an operator to easily check the engagement state of the object to be measured and the tip of the probe.

Additionally, by making it possible to adjust a position of the cylindrical shaped body with respect to the tip of the probe, measurement of objects having various thicknesses can be easily performed.

Additionally, by adopting a double cylinder to the cylindrical shaped body, it is possible to adjust a position of one of the cylinders to the tip of the probe.

Additionally, a means for positioning and fixing the cylindrical body to the tip of the probe is provided on an outer cylinder of the double-cylinder and an inner cylinder screw-engaged with the outer cylinder is axially rotated, thereby it is possible to adjust a position of the cylindrical body to the tip of the probe.

Further, if a scale is provided, indicating displacement of one cylinder to another cylinder, it is possible to easily measure the objects to be measured having various thicknesses.

Additionally, an end plate or conical part may be provided at the top end of the cylindrical shaped body.

The present invention provides a coordinate measuring probe equipped with the coordinate measuring auxiliary tool.

Additionally, the present invention provides a coordinate measuring machine equipped with the coordinate measuring probe.

According to the present invention, since the coordinate measuring probe is moved while the end of the cylindrical shaped body of the coordinate measuring auxiliary tool is brought into contact with a surface of sheet metal, the tip of the coordinate measuring probe (e.g. center of the ball) can be brought into contact with a part to measured at a specified height from the surface of the sheet metal. Accordingly, the maximum circle part of a ball or the like is securely brought into contact with a position to be measured, and high accuracy measurement can be easily performed. Further, variations in measurements by operators can be prevented from occurring. Furthermore, the tip of the probe can be protected.

These and other novel features and advantages of the present invention will become apparent from the following detailed description of preferred embodiments.

BRIEF DESCRIPTION OF THE DRAWINGS

The preferred embodiments will be described with reference to the drawings, wherein like elements have been denoted throughout the figures with like reference numerals, and wherein.

DETAILED DESCRIPTION OF THE PREFERRED EMBODIMENTS

Figure 1:
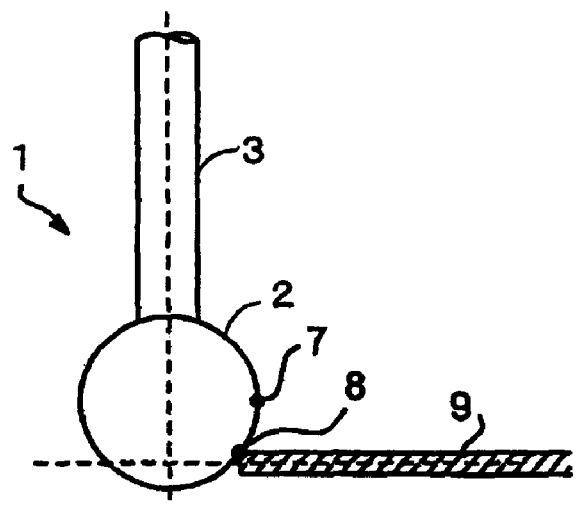
FIG. 1 is a front view for explaining a conventional problem.
Figure 2:
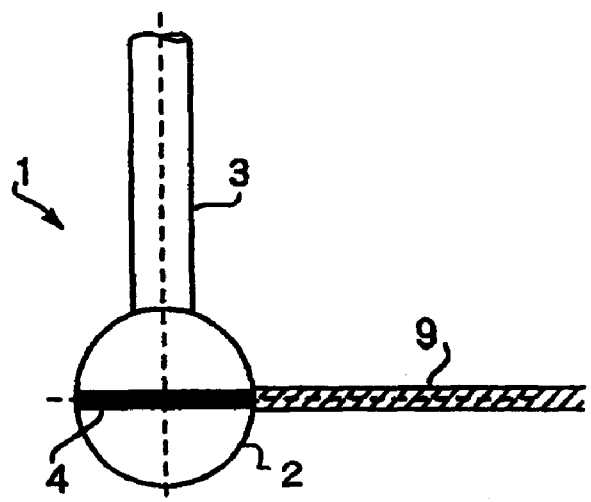
FIG. 2 is a front view showing a prior art disclosed in patent document 1.
Figure 3:
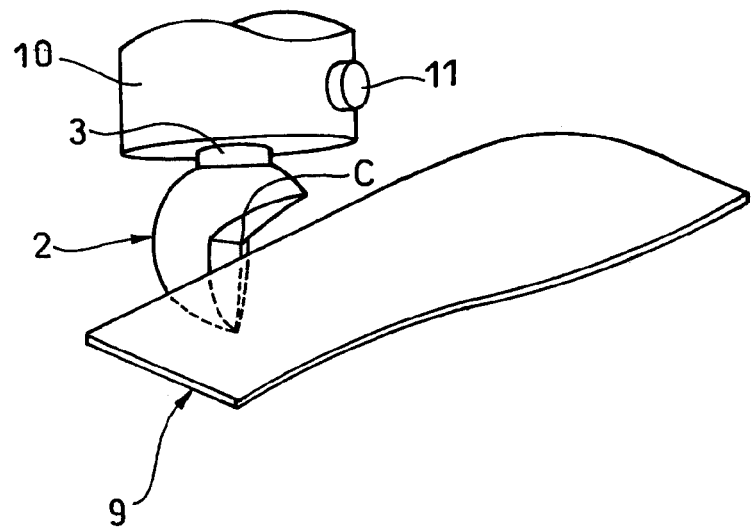
FIG. 3 is a perspective view showing a prior art disclosed in patent document 2.
Figure 4:
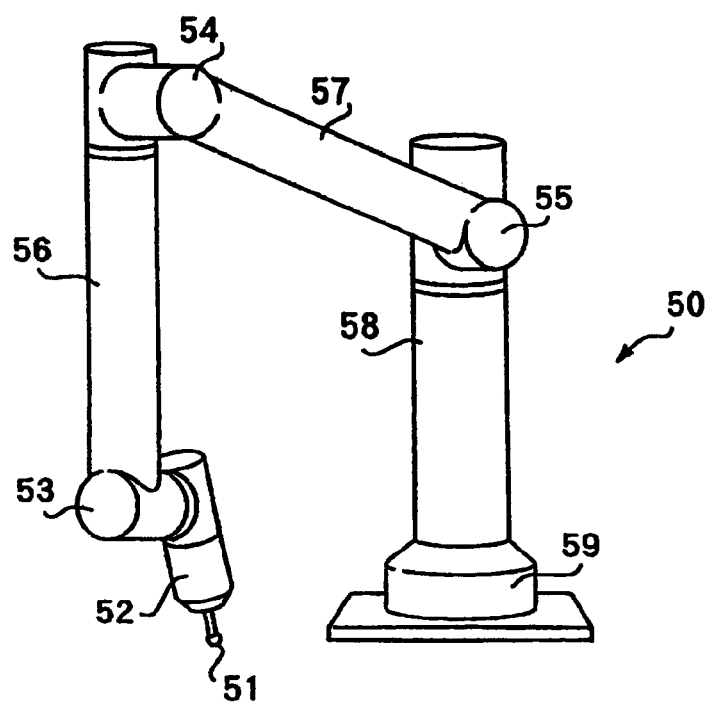
FIG. 4 is a perspective view of an example of an arm type articulated coordinate measuring machine to which the present invention is applied.

Embodiments of the present invention will be described below in detail, the embodiments being adapted to a ball probe of an arm type articulated coordinate measuring machine (called a three-dimensional digitizer).

An arm-type articulated coordinate measuring machine 50, to which the present invention is applied, includes a pole 58 vertically erected on a base 59 fixed to a working table or the like. The pole 58 is connected to an end of a second arm 57 via a third articulation 55 in which a rotary encoder (not shown) is built, the third articulation being capable of freely rotating in biaxial directions and the rotary encoder being capable of detecting each of the rotation angles. The other end of the second arm 57 is connected to an end of a first arm 56 via a second articulation 54 similar to the third articulation 55.

Further, the other end of the first arm 56 is connected to a probe head 52 via a first articulation 53 similar to the second articulation 54. A tip of the probe head 52 is provided with a ball probe 51 of the present invention.

Accordingly, an operator grips and operates the probe head 52 to make the ball probe 51 approach an object to be measured from all directions, and bring the probe into contact with the object at a free angle.

Figure 5:
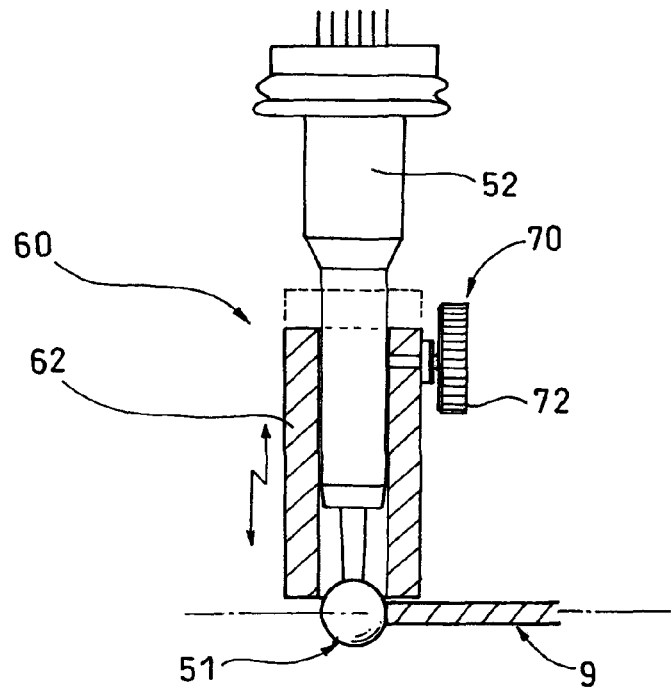
FIG. 5 is a cross sectional view of a ball probe equipped with a coordinate measuring auxiliary tool of a first embodiment of the present invention.

As shown in FIG. 5 showing a first embodiment, the ball probe 51 is equipped with a coordinate measuring auxiliary tool 60 including a cylindrical body 62 attached to an outer circumference of the ball probe 51 and a clamping mechanism 70 for positioning and fixing the cylindrical body 62 to a tip of the ball probe 51.

The cylindrical body 62 is constituted by a transparent body such as acrylic resin, and measurement can be performed while checking the engagement state of a ball at the tip of the ball probe 51 and a work 9 which is the object to be measured. Moreover, the cylindrical body 62 may be made of opaque metal.

Next, a method for measuring the sheet metal work 9 by use of the coordinate measuring auxiliary tool 60 will be described. FIG. 5 shows a state that the tip ball of the ball probe 51 is made to contact with the work 9.

The clamping mechanism 70 is loosened via a knob 72 in advance and the cylindrical body 62 is vertically moved so that the center face of the ball is positioned to a center line of the work 9 when the top end (lower end in FIG. 5) of the cylindrical body 62 is in contact with the surface of the work 9.

The operator moves the ball probe 51 to a target measurement point of the work 9 by manual operation.

Next, the top end of the cylindrical body 62 hits the surface of the work 9 while the posture of ball probe 51 is adjusted so that the center axis of the probe head 52 becomes approximately perpendicular to the surface of the work 9. Thus, the center face of the ball is level with the center line of the work 9, and a coordinate of this point may be captured.

Figure 6:
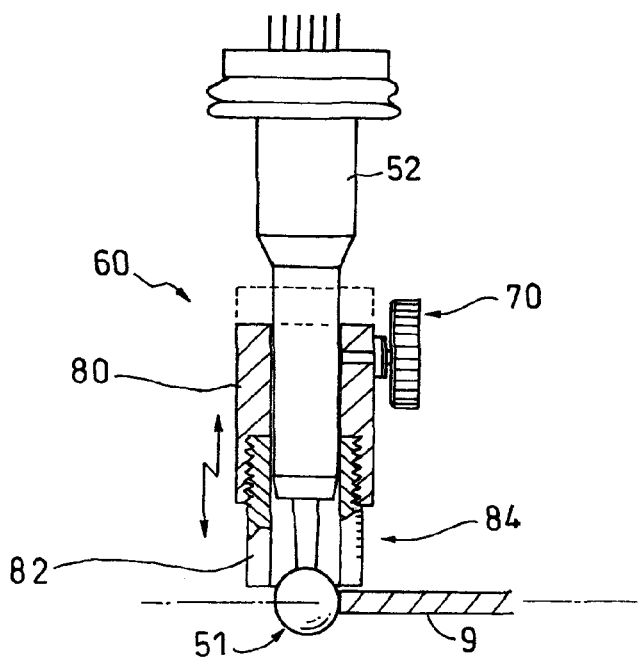
FIG. 6 is a cross sectional view of a ball probe equipped with a coordinate measuring auxiliary tool of a second embodiment of the present invention.

A second embodiment of the present invention is shown in FIG. 6.

In the embodiment, in the coordinate measuring auxiliary tool 60 of the first embodiment, a double cylinder including an outer cylinder 80 and an inner cylinder 82 is employed as a cylindrical shaped body, the coordinate measuring auxiliary tool 60 is fixed to the ball probe 51 by the clamping mechanism 70 provided on the outer cylinder 80, and the inner cylinder 82 screw-engaging with the outer cylinder 80 is rotated around the axis, thereby a positional relationship between the ball and the top end of the cylindrical body (inner cylinder 82) can be adjusted.

Figure 7:
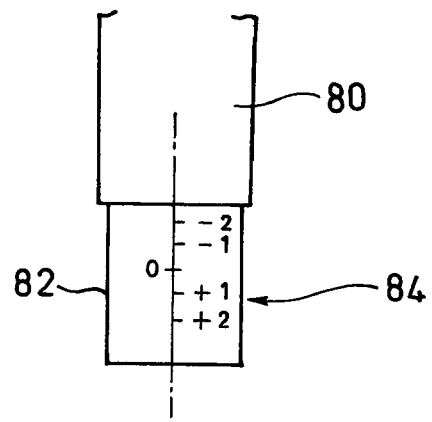
FIG. 7 is a side view of a scale of the second embodiment.

As shown in FIG. 7, a scale 84 is formed on a surface of the inner cylinder 82.

Figure 8:
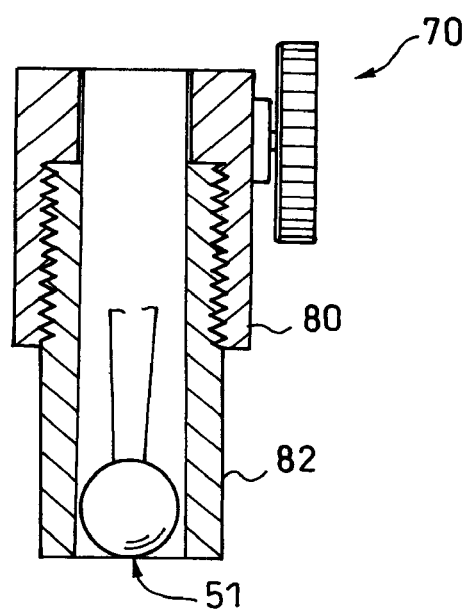
FIG. 8 is a cross sectional view showing an adjustment state of the second embodiment.

In the embodiment, as shown in FIG. 8, a lower end of the ball is made level with a lower end surface of the inner cylinder 82 to clamp them by the clamping mechanism 70. At this time, the scale 84 is set to a negative position by the radius of the ball.

Next, the inner cylinder 82 is rotated with respect to the outer cylinder 80, the scale 84 is raised to a positive position by half of the thickness (e.g. 0.5 to 2 mm) of the work 9, and thus the lower end surface of the inner cylinder 82 can be set at a predetermined height from the center of the ball.

In the embodiment, the scale 84 is provided, and thus height adjustment can be easily performed. Moreover, the scale may be omitted so that adjustment can be visually performed.

Additionally, a mechanism for engagement and movement of the outer cylinder 80 and inner cylinder 82 is not limited to screw tightening, and another mechanism, e.g. a cylindrical cam, applicable for parallel movement is possible.

In the embodiment, since the top end of the cylindrical shaped body is a simply straight shape, the constitution is very simplified.

Figure 9:
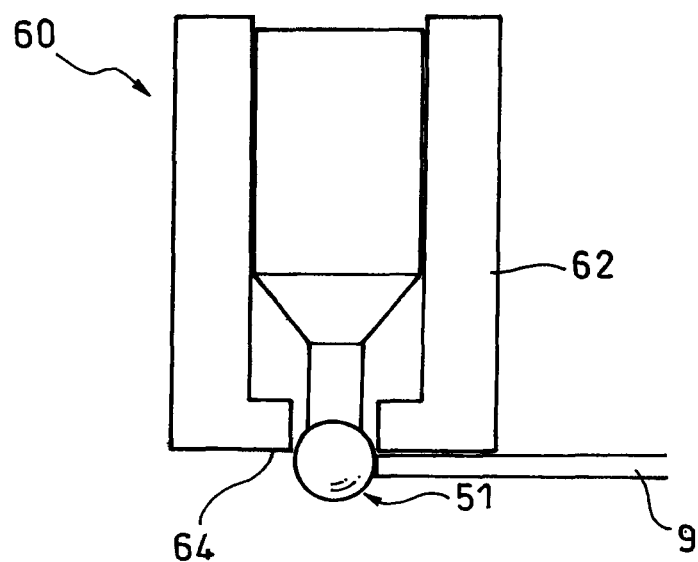
FIG. 9 is a cross sectional view of a ball probe equipped with a coordinate measuring auxiliary tool of a third embodiment of the present invention.

Moreover, as shown in FIG. 9 showing a third embodiment, an end plate 64 is provided at a lower end of the cylindrical body 62, and thus measurement of the flat plate-shaped work 9 can be made easy.

Figure 10:
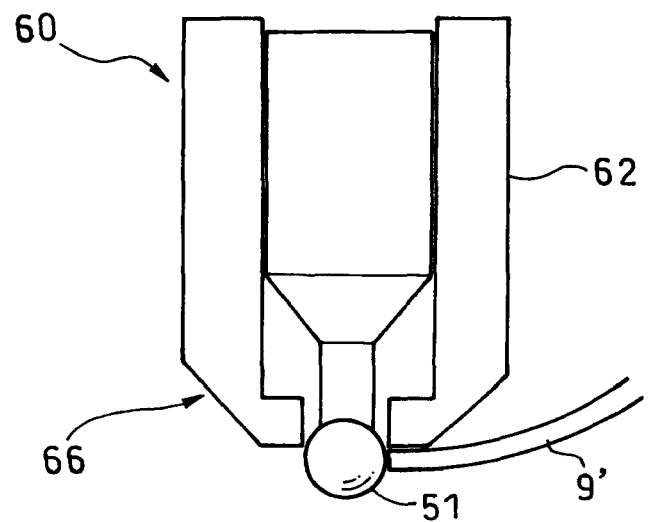
FIG. 10 is a cross sectional view of a ball probe equipped with a coordinate measuring auxiliary tool of a fourth embodiment of the present invention.

Alternatively, as shown in FIG. 10 showing a fourth embodiment, a conical part 66 is provided at the lower end of the cylindrical body 62, and thus measurement of a bent plate-shaped work 9' can be made easy.

Figure 11:
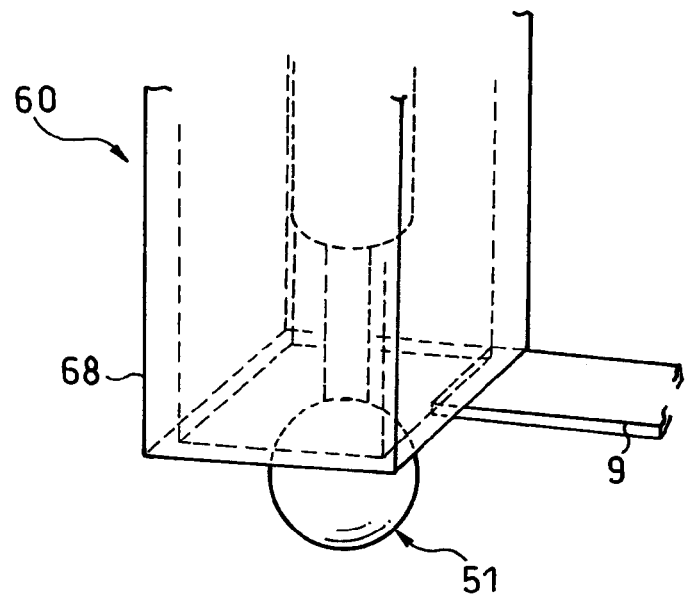
FIG. 11 is a cross sectional view of a ball probe equipped with a coordinate measuring auxiliary tool of a fifth embodiment of the present invention.

The shape of the cylindrical body is not limited to a cylinder, and as shown in FIG. 11 showing a fifth embodiment, any hollow shape having a flat lower end such as a square tube 68 is applicable.

Figure 12:
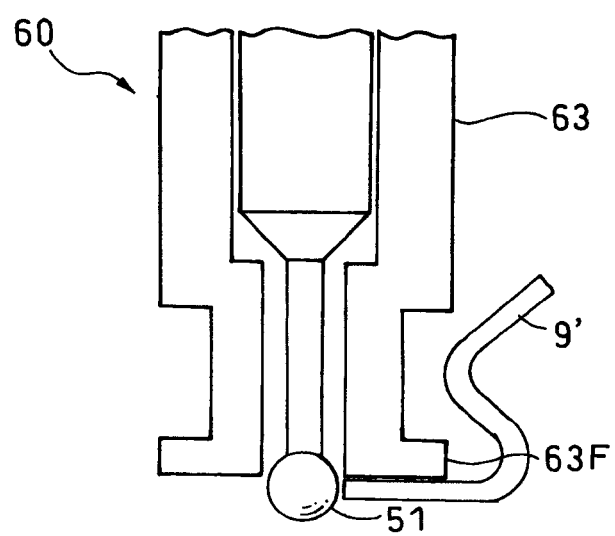
FIG. 12 is a cross sectional view of a ball probe equipped with a coordinate measuring auxiliary tool of a sixth embodiment of the present invention.

Additionally, as shown in FIG. 12 showing a sixth embodiment, if a stepped cylinder 63 is employed, interference between the cylinder and the work can be reduced, and the cylinder is effective for a long stylus. Further, if a flange 63F is provided on an opening of the top end, contact area of the cylinder and the work is increased, and thus, the posture of the cylinder can be further stabilized.

Moreover, though the present invention is applied to the arm type articulated coordinate measuring machine in all the embodiments, an application target of the present invention is not limited to this. For example, the present invention can be similarly applied to a ball probe of a three-dimensional coordinate measuring machine including a gate type or C-shaped frame, and a touch signal probe. Further, the present invention is applicable in the case of not only measuring a sheet metal-shaped work but also performing a depth specified measurement of a cylinder hole having a same height to be measured with the three-dimensional coordinate measuring machine.

It should be apparent to those skilled in the art that the above-described exemplary embodiments are merely illustrative which represent the application of the principles of the present invention. Numerous and various other arrangements can be readily devised by those skilled in the art without departing from the spirit and the scope of the invention.

What is claimed is:

1. A coordinate measuring auxiliary tool comprising:
a cylindrical shaped body attached to an outer circumference of a coordinate measuring probe, the cylindrical shaped body including an extensible double-cylinder; and
a means for positioning and fixing a top end of one of the extensible double-cylinder to just beside a tip of the probe,
wherein the means for positioning and fixing the cylindrical shaped body to the tip of the probe is provided on an outer cylinder of the extensible double-cylinder, an inner cylinder screw-engaged with the outer cylinder is rotated around the axis, and thus a position of the inner cylinder to the tip of the probe can be adjusted.

2. A coordinate measuring auxiliary tool comprising:
a cylindrical shaped body attached to an outer circumference of a coordinate measuring probe, the cylindrical shaped body including an extensible double-cylinder; and
a means for positioning and fixing a top end of one of the extensible double-cylinder to just beside a tip of the probe,
wherein a scale is provided which indicates displacement of one cylinder with respect to another cylinder of the extensible double-cylinder.

3. A coordinate measuring auxiliary tool comprising:
a cylindrical shaped body attached to an outer circumference of a coordinate measuring probe, the cylindrical shaped body including an extensible double-cylinder; and
a means for positioning and fixing a top end of one of the extensible double-cylinder to just beside a tip of the probe,
wherein the means for positioning and fixing the cylindrical shaped body to the tip of the probe is provided on an outer cylinder of the extensible double-cylinder, an inner cylinder screw-engaged with the outer cylinder is rotated around the axis, and thus a position of the inner cylinder to the tip of the probe can be adjusted, and wherein a scale is provided which indicates displacement of one cylinder with respect to another cylinder of the extensible double-cylinder.

* * * * *